(12) United States Patent
Hahn et al.

(10) Patent No.: US 7,662,330 B2
(45) Date of Patent: Feb. 16, 2010

(54) USE OF DESICCANT MATERIAL IN RUBBER COMPOUNDS FOR REDUCING THE CURE TIME OF TIRES

(75) Inventors: Bruce Raymond Hahn, Hudson, OH (US); George Bradley Rufener, Wadsworth, OH (US); Frederick Forbes Vannan, Clinton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 301 days.

(21) Appl. No.: 11/240,873

(22) Filed: Sep. 30, 2005

(65) Prior Publication Data

US 2007/0078210 A1    Apr. 5, 2007

(51) Int. Cl.
*B29C 67/24* (2006.01)
(52) U.S. Cl. .................. 264/330; 264/319; 264/331.11; 264/331.13; 524/433; 425/29
(58) Field of Classification Search ................. 524/433; 264/319, 330, 331.11, 331.13; 425/29
See application file for complete search history.

(56) References Cited

U.S. PATENT DOCUMENTS

| | | | |
|---|---|---|---|
| 2,839,117 A | 6/1958 | Clayton | |
| 3,531,996 A | 10/1970 | Harris et al. | |
| 4,234,636 A * | 11/1980 | Thorsrud et al. | 428/95 |
| 4,490,325 A | 12/1984 | Mattson et al. | |
| 5,254,616 A | 10/1993 | Benko et al. | |
| 6,379,603 B1 | 4/2002 | White et al. | |
| 6,534,571 B1 | 3/2003 | Hoover | |
| 6,566,449 B2 | 5/2003 | Sugimoto et al. | |
| 2003/0111770 A1 | 6/2003 | Bohm et al. | |

FOREIGN PATENT DOCUMENTS

| WO | 9749763 A1 | 12/1997 |
|---|---|---|
| WO | 0188027 A1 | 11/2001 |

OTHER PUBLICATIONS

European Search Report, European Patent Application No. 06121156.1, mailed Jan. 15, 2007, 6 pages.

* cited by examiner

*Primary Examiner*—Peter D Mulcahy
(74) *Attorney, Agent, or Firm*—Wood, Herron & Evans, L.L.P.

(57) ABSTRACT

The present invention is directed towards the use of low levels of a desiccant material in a rubber compound, such as for use as a tire tread, that allows for reduced cure times of tires cured under pressure, thereby increasing tire production. The low level of desiccant material reduces the blow point of the rubber compound by substantially eliminating blows earlier in the pressure curing process, thereby allowing for the reduced cure time of the tire under pressure. In one embodiment, low levels of no greater than about 9 phr of desiccant material, which may include generally a metal oxide (e.g. calcium oxide or magnesium oxide), are provided in the rubber compound. The rubber compound including the low levels of desiccant material may be cured, under pressure, at less than 30% of full cure of the rubber compound.

15 Claims, No Drawings

USE OF DESICCANT MATERIAL IN RUBBER COMPOUNDS FOR REDUCING THE CURE TIME OF TIRES

FIELD OF THE INVENTION

The present invention pertains to desiccant material and to methods of use thereof for reducing the curing time of tires cured under pressure.

BACKGROUND OF THE INVENTION

Tires, including tire components, must typically be cured under pressure beyond what is known as the blow point, which is the point of cure of the rubber compound where blows no longer form. Blows generally are small or large bubbles, or blisters, that are formed in the rubber compound as a result of the formation and expansion of gases trapped therein during curing. In a typical pressure molding process, e.g. compression or injection molding, the external pressure from the mold helps prevent the gases from expanding. At a certain point during vulcanization or crosslinking of the rubber compound, i.e. the blow point, the modulus of the rubber compound prevents further expansion of the gases, without pressure from the curing mold. In typical rubber compounds, the blow point is a level of curing of those compounds that is usually at least 30% of full cure thereof. At this point, the tire can be removed from the mold.

In a tire, the cure time typically is set so that the point of least cure exceeds the blow point. The location of least cure is usually found at the thickest part of the tire. In order to increase the production rate of pressure-cured tires, it would be desirable to lower the curing time. Lowering the blow point will reduce the cure time of tires cured under pressure, allowing for increased tire production. As indicated above, the blow point is the extent of cure of the rubber compound of interest wherein gas expansion generated during pressure curing of the rubber compound no longer occurs. Normally, long cure times under pressure, e.g. 30% to 100% of the full cure of the rubber compound, are required for the elimination of blows in curing tires or tire components. In pressureless cures, such as high temperature salt baths, high levels of a desiccant, e.g. at least about 12 phr, are required for the elimination of blows. PHR is used herein to describe parts by weight per 100 parts by weight of rubber in the rubber compound.

Accordingly, there remains a need for an improved method for reducing the curing time of tires cured under pressure to increase the production rate thereof.

SUMMARY OF THE INVENTION

To increase tire production, the present invention provides for an improved method for reducing the curing time of tires cured under pressure by using low levels of desiccant material in the tire's rubber compounds, e.g. a tire tread. The low level of desiccant material reduces the blow point of the rubber compound by preventing blows earlier in the pressure curing process, thereby allowing for the reduced cure time of the tire under pressure.

In one embodiment, low levels of no greater than about 9 phr of desiccant material are provided in a rubber compound for use in a tire, such as a passenger or truck tire. The desiccant material may include generally a metal oxide, e.g. calcium oxide or magnesium oxide. In another embodiment, the desiccant material is an 80/20 blend by weight of calcium oxide in naphthenic oil present in low levels or a range of about 3 to about 6 phr of the rubber compound.

The rubber compound including the low levels of desiccant material can be cured, under pressure, at less than 30% of full cure of the rubber compound. The full cure of the rubber compound of the tire may be determined or measured by means known in the art, such as by use of cure rheometer and thermocouple data.

By virtue of the foregoing, there is thus provided an improved method for reducing the curing time of tires cured under pressure to increase the production rate thereof by incorporating low levels of desiccant material into the rubber compound(s) of these tires.

The features and objectives of the present invention will become more readily apparent from the following Detailed Description.

DETAILED DESCRIPTION OF THE INVENTION

The present invention is directed towards the use of low levels of a desiccant material in a rubber compound, such as but not limited to use as a tire tread, to allow for reduced cure times of tires cured under pressure, thereby increasing the tire production rate. The resultant tires, or tire components, include substantially no blows.

In one embodiment, low levels of no greater than about 9 phr of desiccant material are provided in the rubber compound. In another embodiment, the desiccant material is present in an amount not greater than about 6 phr. In another embodiment, the desiccant material is present in an amount not greater than about 3 phr. In yet another embodiment, the desiccant material is present in a range of about 3 phr to about 9 phr. In another embodiment, the desiccant material is present in a range of about 3 to about 6 phr. It should be understood that the desiccant material may be present in different amounts in different areas of the tire itself corresponding to the different rubber compounds utilized in preparing the components of the tire. For example, if two different rubber compounds separately define a tread and the sidewalls, the sidewalls (a thinner portion of the tire) may include about 3 to about 6 phr of desiccant material uniformly distributed throughout that rubber compound and the tread (a thicker portion of the tire) may include about 6 to about 9 phr of desiccant material.

The desiccant material of the present invention may include generally a metal oxide, such as calcium oxide (CaO) or magnesium oxide (MgO). The metal oxide may be blended with oil, such as naphthenic oil, for addition to the rubber compound. In one embodiment, the desiccant material is an 80/20 blend by weight of calcium oxide in naphthenic oil.

At typical tire pressure curing temperatures of about 150° C. or higher, water, which is present in the rubber compound and has a boiling point of 100° C., evaporates into a gas to form blows in the rubber compound. With the addition of the desiccant material, water can react during the pressure curing process, such as with the calcium oxide, to form calcium hydroxide $Ca(OH)_2$. The calcium hydroxide remains as a solid at the curing temperature, thus reducing the volume of gas which could form blows and decreasing the curing time of the tire under pressure, thereby allowing for an increased tire production rate.

In accordance with the present invention, the use of the desiccant material allows for reduced curing time of a tire cured under pressure. In one embodiment, a tire with a rubber compound comprising the low levels of desiccant material is cured under pressure at less than 30% of full cure of the rubber compound. The full cure of the rubber compound of the tire may be determined or measured by means known in the art, such as by use of a cure rheometer and thermocouple data. For example, if it is determined, such as by use of a cure rheometer, that the full cure of the rubber compound involves a curing time of 20 minutes, the use of low levels of desiccant material would allow the rubber compound, or tire, to be cured under pressure at less than 30% of 20 minutes, i.e. in less than 6 minutes. In another embodiment, the rubber compound including low levels of desiccant material may be cured, under pressure, at less than about 20% of full cure. In yet another embodiment, the cure time is no less than about 10% and no greater than about 20% of full cure.

Non-limiting examples of various rubber compounds incorporating low levels of desiccant material in accordance with the present invention are disclosed in Table 1 below. The rubber compounds in Table 1 were prepared by methods known in the art.

TABLE 1

Rubber Compounds

|  | Rubber Compound | | | |
|---|---|---|---|---|
|  | 2A (control) | 2B | 2C | 2D |
| First, non-productive, mix stage | phr | phr | phr | phr |
| Natural Rubber[1] | 20 | 20 | 20 | 20 |
| emulsion SBR[2] | 80 | 80 | 80 | 80 |
| carbon black[3] | 60 | 60 | 60 | 60 |
| Antidegradant[4] | 1 | 1 | 1 | 1 |
| Antidegradant[4] | 1.5 | 1.5 | 1.5 | 1.5 |
| Antidegradant[4] | 0.75 | 0.75 | 0.75 | 0.75 |
| stearic acid | 1 | 1 | 1 | 1 |
| zinc oxide | 3 | 3 | 3 | 3 |
| Second, productive, mix stage | phr | phr | phr | phr |
| Accelerator[5] | 1.3 | 1.3 | 1.3 | 1.3 |
| sulfur | 1 | 1 | 1 | 1 |
| secondary accelerator[6] | 0.5 | 0.5 | 0.5 | 0.5 |
| Desiccant material[7] | 0 | 3 | 6 | 9 |
| TOTAL PHR | 170 | 173 | 176 | 179 |

[1]Natural rubber: cis 1,4 polyisoprene type
[2]Emulsion: SBR, 23 percent styrene (available from The Goodyear Tire and Rubber Company)
[3]Carbon black: N220 ASTM
[4]Antidegradants: amine type antidegradants including paraphenylene diamines and polymerized quinoline
[5]Accelerator, sulfonamide type
[6]Secondary accelerator, amine type
[7]Desiccant, blend of calcium oxide in naphthenic oil, 80/20

Cure times for the rubber compounds disclosed in Table 1 were measured using a moving disc rheometer (MDR) as is known in the art. The data from these measurements are presented in Table 2 below.

TABLE 2

Cure Rheometer (MDR) Data

| MDR Data 150° C. | 1A | 1B | 1C | 1D |
|---|---|---|---|---|
| S' Max (dNm) | 18.06 | 19.8 | 20.02 | 20.07 |
| S' Min (dNm) | 3.75 | 3.75 | 3.7 | 3.78 |
| S' Max − S' Min (dNm) | 14.31 | 16.05 | 16.32 | 16.29 |
| T2 (minutes) | 0.83 | 1.11 | 1.09 | 1.3 |
| T10 (minutes) | 5.03 | 7.27 | 8.5 | 9.46 |
| T20 (minutes) | 6.92 | 9.53 | 10.84 | 11.78 |
| T25 (minutes) | 7.43 | 10.12 | 11.41 | 12.34 |
| T50 (minutes) | 8.86 | 12.08 | 13.37 | 14.33 |
| T70 (minutes) | 10.22 | 13.99 | 15.23 | 16.26 |
| T90 (minutes) | 13.93 | 18.88 | 19.78 | 20.8 |

The rubber compounds 1A, 1B, 1C, and 1D from Table 1 were cured at 150° C. using a bladder mold with a pressure of 100 psi. The rubber compounds were cured under pressure for 2, 4, 5, and 8 minutes. The pressure from the bladder was then released after these times, which represent times above and below the blow point determined for sample 1A, sample 1A being the control or rubber compound devoid of desiccant material. The blow point for 1A was determined by visual inspection to be at T25 or at about 7.4 minutes. The full cure of each rubber compound was determined to be at the T90 time. For example, the full cure of 1A was 13.93 minutes.

After 2 minutes, visual inspection of the rubber compounds revealed that rubber compounds 1A, 1B, and 1C included blows but 1D did not. After 4 minutes, only rubber compounds 1A and 1B included blows. After the 5-minute cure time, only rubber compound 1A included blows. Finally, at the 8-minute cure time no rubber compounds showed blows. Relative to the use of no desiccant, this data indicates that cure times can be reduced up to about 75% using 9 phr of desiccant material, up to about 50% using 6 phr of desiccant, and up to about 37% using 3 phr of desiccant material in the rubber compounds.

In addition, considering the full cure time at T90 for each of 1B, 1C, and 1D and the approximate blow points thereof as determined from the visual inspections, the pressure curing time of the rubber compound using 9 phr of desiccant material may be less than about 10% of the full cure thereof; the pressure curing time of the rubber compound using 6 phr of desiccant material may be less than about 20% of the full cure thereof; and the pressure curing time of the rubber compound using 3 phr of desiccant material may be less than 30% of the full cure thereof. In comparison, the curing time of the rubber compound of 1A under pressure should be no less than 57% of the full cure of the tire compound in order to surpass the blow point.

Other non-limiting examples of various rubber compounds incorporating low levels of desiccant material in accordance with the present invention are disclosed in Table 3 below. The rubber compounds in Table 3 were prepared by methods known in the art.

TABLE 3

Rubber Compounds

|  | Rubber Compound | | | |
|---|---|---|---|---|
|  | 2A (control) | 2B | 2C | 2D |
| First, non-productive, mix stage | phr | phr | phr | phr |
| Cis 1,4-polybutadiene[1] | 20 | 20 | 20 | 20 |
| natural rubber[2] | 80 | 80 | 80 | 80 |
| precipitated silica[3] | 15 | 15 | 15 | 15 |
| carbon black[4] | 30 | 30 | 30 | 30 |
| Coupler[5] | 5 | 5 | 5 | 5 |
| Antidegradants[6] | 1 | 1 | 1 | 1 |
| Antidegradants[6] | 1.5 | 1.5 | 1.5 | 1.5 |
| Antidegradants[6] | 0.75 | 0.75 | 0.75 | 0.75 |
| stearic acid | 1 | 1 | 1 | 1 |
| zinc oxide | 5 | 5 | 5 | 5 |
| Second, productive, mix stage | phr | phr | phr | phr |
| Accelerator[7] | 3 | 3 | 3 | 3 |

TABLE 3-continued

Rubber Compounds

| | Rubber Compound | | | |
|---|---|---|---|---|
| | 2A (control) | 2B | 2C | 2D |
| Accelerator[7] | 1.75 | 1.75 | 1.75 | 1.75 |
| insoluble sulfur | 3 | 3 | 3 | 3 |
| Desiccant material[8] | 0 | 3 | 6 | 9 |
| TOTAL PHR | 164 | 167 | 170 | 173 |

[1]Cis 1,4-polybutadiene: obtained as Budene 1208 (available from The Goodyear Tire and Rubber Company)
[2]Natural rubber: cis 1,4-polyisoprene type
[3]Silica: Zeopol 8745, hydrated amorphous silica)
[4]Carbon black: N550 ASTM
[5]Coupler: X266S, a composite of 50/50 ratio of bis-(3-ethoxysilylpropyl) disulfide on a carbon black substrate (available from Degussa AG)
[6]Antidegradants: amine type antidegradants including paraphenylene diamines and polymerized quinoline.
[7]Accelerators: sulfonamide type
[8]Desiccant material: 80/20 blend of calcium oxide in naphthenic oil Cure times for the rubber compounds disclosed in Table 3 again were measured on a moving disc rheometer (MDR). The data from these measurements are presented in Table 4 below.

TABLE 4

Cure Rheometer (MDR) Data

| MDR Data 150° C. | 1A | 1B | 1C | 1D |
|---|---|---|---|---|
| S' Max (dNm) | 22.01 | 19.84 | 19.86 | 19.57 |
| S' Min (dNm) | 2.66 | 2.81 | 2.81 | 2.84 |
| S' Max − S' Min (dNm) | 19.35 | 17.03 | 17.05 | 16.73 |
| T2 (minutes) | 0.13 | 0.13 | 0.12 | 0.13 |
| T10 (minutes) | 4.03 | 3.5 | 3.78 | 3.9 |
| T20 (minutes) | 5.31 | 6.28 | 6.24 | 6.12 |
| T25 (minutes) | 5.59 | 6.67 | 6.53 | 6.37 |
| T50 (minutes) | 6.31 | 7.25 | 7.01 | 6.81 |
| T70 (minutes) | 7.02 | 7.65 | 7.4 | 7.21 |
| T90 (minutes) | 9.14 | 8.76 | 8.48 | 8.3 |

The rubber compounds 2A, 2B, 2C, and 2D in Table 3 were cured at 150° C. using a bladder mold with a pressure of 100 psi. The rubber compounds were cured under pressure for 4 minutes and 6 minutes. The pressure from the bladder was then released after these times, which represent times above and below the blow point determined for sample 2A, sample 2A being the control or rubber compound devoid of desiccant material. The blow point for 2A was determined by visual inspection to be at T25 or at about 5.6 minutes. The full cure of each rubber compound was taken to be at the T90 time. For example, the full cure of 2A was 9.14 minutes.

After 4 minutes, visual inspection of the rubber compounds of Table 3 revealed that only rubber compound 2A included blows while rubber compounds 2B, 2C, and 2D did not, thus, indicating that the cure time under pressure may be reduced up to at least 25% relative to the use of no desiccant. In addition, although visual inspections for blows in the rubber compounds of Table 3 did not occur earlier than 4 minutes, it is believed that the pressure curing time of 2B, 2C, and/or 2D may be completed at less than 30% of the full cure of the rubber compound. Also, it is noted that the curing time under pressure of the rubber compound of 2A should be no less than 61% of the full cure of the tire compound in order to surpass the blow point.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A method of curing a tire, comprising:
   determining a full cure time (T90) of an uncured rubber compound comprising a desiccant material present in an amount greater than zero to about 9 phr;
   curing a green tire including the uncured rubber compound comprising the desiccant material under a curing pressure and at a curing temperature for a time period no greater than 30% of the full cure time (T90) to form a partially-cured rubber compound; and
   releasing the curing pressure, wherein the partially-cured rubber compound includes substantially no blows, and allowing the partially-cured rubber compound to fully cure.

2. The method of claim 1 wherein the desiccant material includes calcium oxide.

3. The method of claim 2 wherein the desiccant material is an 80/20 blend of calcium oxide in naphthenic oil.

4. The method of claim 1 wherein the desiccant material is present in an amount not greater than about 6 phr.

5. The method of claim 1 wherein the desiccant material is present in an amount not greater than about 3 phr.

6. The method of claim 1 wherein the desiccant material is present in a range of about 3 phr to about 9 phr.

7. The method of claim 1 wherein the curing includes curing under a curing pressure and at a curing temperature for a time period no greater than about 20% of the full cure time (T90) to form a partially-cured rubber compound.

8. The method of claim 1 wherein the curing includes curing under a curing pressure and at a curing temperature for a time period no less than about 10% and no greater than about 20% of the full cure time (T90) to form a partially-cured rubber compound.

9. The method of claim 1 wherein the fully cured rubber compound defines a tread.

10. A method of curing a tire, comprising:
    determining a full cure time (T90) of an uncured rubber compound comprising a desiccant material in an amount of about 3 phr to about 9 phr;
    curing a green tire including the uncured rubber compound comprising the desiccant material under a curing pressure and at a curing temperature for a time period no less than about 10% and no greater than about 20% of the full cure time (T90) to form a partially-cured rubber compound; and
    releasing the curing pressure, wherein the partially-cured rubber compound includes substantially no blows, and allowing partially-cured rubber compound to fully cure, the fully-cured rubber compound defines a tire tread.

11. The method of claim 10 wherein the desiccant material includes calcium oxide.

12. The method of claim 11 wherein the desiccant material is an 80/20 blend of calcium oxide in naphthenic oil.

13. The method of claim 10 wherein the green tire includes a second uncured rubber compound defining sidewalls, the sidewalls comprising about 3 to about 6 phr of desiccant material.

14. The method of claim 13 wherein the tread comprises about 6 to about 9 phr of desiccant material.

15. The method of claim 10 further comprising, prior to curing the green tire, mixing the desiccant material with the uncured rubber compound in a range of about 3 phr to about 9 phr; and assembling the green tire including the uncured rubber compound comprising the desiccant material.

* * * * *

UNITED STATES PATENT AND TRADEMARK OFFICE
CERTIFICATE OF CORRECTION

PATENT NO. : 7,662,330 B2  Page 1 of 1
APPLICATION NO. : 11/240873
DATED : February 16, 2010
INVENTOR(S) : Bruce Raymond Hahn et al.

It is certified that error appears in the above-identified patent and that said Letters Patent is hereby corrected as shown below:

CLAIM 4
Column 6, Line 30
Change "not greater than about 6phr." to --greater than zero to about 6 phr.--.

CLAIM 5
Column 6, line 32
change "not greater than about 3phr." to --greater than zero to about 3 phr.--.

Signed and Sealed this

Second Day of November, 2010

David J. Kappos
*Director of the United States Patent and Trademark Office*